(12) United States Patent
Livingston (10) Patent No.: US 9,015,992 B1
(45) Date of Patent: Apr. 28, 2015

(54) PREVEGETATED BLANKET

(71) Applicant: Robert E. Livingston, Twin Lakes, WI (US)

(72) Inventor: Robert E. Livingston, Twin Lakes, WI (US)

(*) Notice: Subject to any disclaimer, the term of this patent is extended or adjusted under 35 U.S.C. 154(b) by 62 days.

(21) Appl. No.: 13/729,035

(22) Filed: Dec. 28, 2012

Related U.S. Application Data (63) Continuation-in-part of application No. 12/798,367, filed on Apr. 1, 2010, now Pat. No. 8,365,467.

(51) Int. Cl.
    *A01G 9/02*     (2006.01)
    *A01G 1/00*     (2006.01)

(52) U.S. Cl.
    CPC ..................... *A01G 1/007* (2013.01)

(58) Field of Classification Search
    USPC .......... 47/56, 65.9, 73, 75, 78, 84; 211/126.8, 211/126.9, 126.2
    See application file for complete search history.

(56) References Cited

U.S. PATENT DOCUMENTS

| | | | |
|---|---|---|---|
| 3,142,133 A * | 7/1964 | Brooks | 47/73 |
| 3,482,707 A * | 12/1969 | Weiss | 211/126.2 |
| 3,549,018 A * | 12/1970 | Wilson | 211/126.2 |
| 3,675,815 A * | 7/1972 | Rehrig | 206/507 |
| 4,023,506 A * | 5/1977 | Robey | 47/58.1 R |
| D248,935 S * | 8/1978 | Stutelberg et al. | D11/155 |
| 4,441,615 A * | 4/1984 | Goodrich | 206/511 |
| 4,759,451 A * | 7/1988 | Apps | 211/126.4 |
| 5,187,894 A * | 2/1993 | Ripley et al. | 47/86 |
| RE35,006 E * | 8/1995 | Ripley et al. | 47/65.9 |
| 6,135,672 A * | 10/2000 | Davidson | 405/19 |
| 7,845,113 B2 * | 12/2010 | Casimaty et al. | 47/65.9 |
| 7,958,669 B2 * | 6/2011 | Casimaty et al. | 47/1.01 F |
| 8,122,682 B2 * | 2/2012 | Mischo | 52/747.1 |
| 8,365,467 B1 * | 2/2013 | Livingston | 47/65.9 |
| 8,720,687 B2 * | 5/2014 | Hassell | 206/507 |
| 2003/0183140 A1 * | 10/2003 | Layt | 111/105 |
| 2008/0168710 A1 * | 7/2008 | MacKenzie | 47/65.9 |
| 2011/0197523 A1 * | 8/2011 | Dubner | 52/173.1 |
| 2014/0026480 A1 * | 1/2014 | Lenhart et al. | 47/65.9 |

* cited by examiner

*Primary Examiner* — Kristen C Hayes
(74) *Attorney, Agent, or Firm* — Brie A. Crawford (57) ABSTRACT

A prevegetated blanket is formed, grown, and transported to an installation site in a tray specifically suited for this purpose. Growth in a tray system offers an improved and protected root system and provides for ease of transport and installation. The tray has side walls and a t-grid floor to permit growth of the blanket. The tray also has interlocking capabilities for nestable or non-nestable stacking. After growth in a controlled environment, the prevegetated blanket with the tray is transferred to a specific site and installed immediately after soil is prepared. Due to the tray design, the product is light weight and facilitates ease of handling with minimal disturbance of the root structure.

6 Claims, 10 Drawing Sheets

PREVEGETATED BLANKET

CROSS REFERENCE TO RELATED APPLICATION AND INCORPORATION BY REFERENCE

This application is a continuation-in-part of and claims priority to the previously filed United States of America Utility Patent Application titled PREVEGETATED BLANKET, with an application filing date of Apr. 1, 2010, in the United States Patent and Trademark Office, application Ser. No. 12/798,367, by the same inventive entity, the entirety of said application being incorporated herein by reference in its entirety to provide continuity of disclosure. A Notice of Allowance was granted on application Ser. No. 12/798,367 on Sep. 28, 2012.

FIELD OF INVENTION

This invention relates to a tray for a prevegetated blanket and more particularly to a tray for growing, forming, and transporting a prevegetated blanket which protects the exposed soil surface from erosion in an efficient manner.

BACKGROUND OF THE INVENTION

In any construction procedure, soil erosion is usually a major problem. With soil erosion, prevention is always easier than correction. Many ways are known in the prevention of soil erosion. In soil areas, with vegetation growing, the root system of the plants can prevent erosion. So, the faster root growth can occur in the area, the more likely it is that soil erosion can be prevented, or at least minimized.

Current erosion treatments are carried out after the site is graded and seed is applied. A site-specific seed type and cover crop are applied by broadcast seeding, slip seeding, drill seeding, or hydro-seeding. With favorable weather conditions or supplemental watering in controlled increments, the seed source may start to establish within three or four weeks. The soil can then be stabilized with the living plants. In the meantime, this practice presents a great potential problem for causing soil loss by erosion, due to the period of no vegetation and lack of emerging root growth.

Typical seeds for cover crops include, but are not limited to annual rye, fescue and spring oats. Seeding generally takes longer to establish the root system to minimize or prevent erosion. Those plants usually require two or three growing seasons for maturity and the establishment of good ground cover. In normal practices, job site and outside conditions affect the success of seed growth. Heavy rain or hot climates can cause the seed or soil to erode without proper maintenance.

In extremely difficult climates, additional water and herbicide treatments are necessary to establish the seed and create a root base to minimize erosion. If the site is already suffering from damage, such as erosion problems, additional soil and seed applications may be necessary. Such actions add greatly to the expense of erosion prevention.

Soil customarily contains tremendous amounts of seed sources that produce weeds. Once the soil is disturbed, new annual weeds will begin to germinate, and overtake a cover crop and the native seed source. Weeds are very undesirable. Avoidance of a weed crop is very desirable. Quick growth of desired vegetation is a very desirable method of avoiding a weed crop.

Currently, live plugs, which are small pieces of desired vegetation, are the only way to produce immediate vegetation coverage to compete with weed seeds. Planting the live plugs is labor-intensive. The plugs themselves are also costly. Then, the maintenance of the plugs is a problem.

Additionally, because of short growing seasons in the upper Midwest, the success of the native species and its growth will be shortened. It will therefore take more growing seasons to have any native species function as the erosion-preventing ground cover. In that case, treatments to prevent extreme weed competition can include controlled burns or herbicides. Such treatments can cause more problems than they solve. A controlled burn requires a fire department presence for reasonable safety. Herbicides have environmental consequences, even with careful application thereof.

Normally when exposed soil is to be seeded after the grade, a seed type is applied by either broadcast or hydro-seeding. But at application, the specified seed is just that, seed. It has not developed into an erosion preventing plant. Thus, it usually will take a three to four week period, under good growing conditions, to produce a cover crop. Seed generally takes longer to establish than living plants to take hold and root.

Also, a seeding process is usually fighting many uphill battles. Inclement weather types, such as heavy rains, extreme heat or both, may prevent seeds from rooting or sprouting. Even under an erosion control blanket, seeds still have those problems. If the construction site is already wet or has a fast and unpredicted rise of water flow, because of urban run off or naturally occurring stream rising or falling, it creates additional issues for seeds. Other problems for seeds include spikes in runoff or rain fall which can prevent full establishment of the seed.

If the seeding processes needs to be repeated, much more labor, expense, and tremendous efforts are required to repeat ground preparation and to re-seed. In contrast, if the initial seeding process is successful, the originally installed seeds require constant maintenance; such as adding new soil, reseeding, using additional water or re-blanketing as a special erosion control measure. These ongoing maintenance operations add a tremendous additional expense. If the project is successful for normal operation standards, weed treatments such as herbicides or cutting still must be done to allow access for Native foliage to grow. Then, in most of the United States, the summer heat arrives for many weeks. Native foliage, being succulent and young cannot fight the annual weed competition.

Such plantings are not acceptable and will not get the appropriate signing off as successful by the permitting authority, engineers or the contractor. General contractors and subcontractors are not paid until the project is approved, thereby restricting cash flow.

While this may seem odd, under normal practices, this is usually how commercial jobs operate. Because of unit costs up front, ground cover installation prices per unit are very expensive. No appropriate solution is currently available.

The true price per unit is high and still may take years to see true success. In the interim, soil loss and natural waterways, wetlands, or other areas are polluted. Remedies therefore occur at a large cost. Compounding daily across the United States is a large scale environmental problem from non source point pollution.

It is very necessary to create an alternative process to limit loss exposure and create situations to have a better chance of success; such success including, but not limited to, reduced overall herbicide use and limiting the damage of storm events, thereby allowing credible changes in plant community establishment faster and protecting our environment. To that end, it is very desirable to have an efficient method of getting desired vegetation in a desired place quickly. It is furthermore valuable to be able to control erosion and produce native grass or turf grass on difficult sites or erodible soils quickly and efficiently with reduced labor and maintenance requirements.

Attempts to solve some of these problems with vegetated blankets can also be a problem. It is difficult to produce a proper blanket for control of erosion. Additionally, it is difficult to move the blankets to a desired location. Then application of the blanket to the desired surface can be complicated and difficult.

Traditionally, landscape blankets are rolled and transported to an installation site via trucks. Rolled or block cut sod is rolled and transported via truck after cutting established root growth. Further, in the transportation process, roots are compressed and further damaged.

It will be a useful invention to create a tray which allows a prevegetated blanket to form and grow in the tray. Then, the tray can be transported to the job site via truck without rolling the prevegetated blanket or cutting or damaging established root growth.

SUMMARY OF THE INVENTION

Among the many objectives of the present invention is the provision of a prevegetated blanket providing desired seeds and low maintenance to a desired area of erodible soil.

Another objective of the present invention is the provision of a prevegetated blanket, which is easily maintained.

Yet another objective of the present invention is the provision of a prevegetated blanket, which minimizes environmental damage.

Still another objective of the present invention is the provision of a prevegetated blanket, which provides for at least reduced herbicide treatment.

A further objective of the present invention is the provision of a prevegetated blanket, which uses minimal water.

A still further objective of the present invention is the provision of a prevegetated blanket, which-minimizes erosion.

Yet a further objective of the present invention is the provision of a prevegetated blanket, which provides for no herbicide treatment.

Another objective of the present invention is the provision of a prevegetated blanket, which is easily transported.

Yet another objective of the present invention is the provision of a prevegetated blanket, which is easily installed.

A still further objective of the present invention is the provision of a tray which facilitates ease of growth, transportation, and installation.

These and other objectives of the invention (which other objectives become clear by consideration of the specification, claims and drawings as a whole) are met by providing a tray for a prevegetated blanket which allows for ease of growth, transportation, and installation of the blanket and does not cause harm or further damage to the roots during transportation.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

Components of the prevegetated blanket of this invention prevent erosion and grow a living membrane for native and cover crops in a controlled environment in a weed free state. Then, the prevegetated blanket is transferred to a specific site and installed immediately after soil is prepared. By the end of Day 5, a living plant matrix is installed. Roots will be established in the soil within about two days of blanket installation, because the roots already exist. Plant heights will vary on species but are usually about 7.6 centimeters (three inches) to 15.2 centimeters (six inches) tall upon installation and provide an immediate good cover crop.

Weed seeds are not exposed to sun and are covered, thereby at least substantially reduced as a living crop. In fact, weeds can now be kept to a dormant state. Also, erosion caused by even heavy rainfall will be decreased by 50 percent upon installation:

This process uses improved erosion control methods in place of standards followed by engineers across the country. Additionally solar heat and sun, organic watering along with standard growth media, such as top soil, and neutral root media permit plants to thrive. They are cost effective and provide at least eighty percent (80%) cover. Thus, these are living plant communities born to prevent erosion.

A substrate receives a growth medium or a topsoil layer and desired seeds. Preferably, the substrate is a fibrous, non-woven substrate, or a fiber pad. Such substrates are known as erosion control blankets. At least one net layer supports the substrate and keeps desired materials therein or thereon. The net layer may be polyethylene, polypropylene, or another suitable polymer, or copolymers thereof. A polypropylene net appears to be more durable and is preferred. More preferred is to have the net be of biodegradable material. The net, with its 5 lines and openings, provide structure and strength for the prevegetated blanket, without interfering with the purpose thereof.

The prevegetated blanket utilizes significantly less top soil than previous, conventional methods. Due to the reduction in the amount of top soil, the prevegetated blankets weigh significantly less and can be carried to job sites where vehicles cannot travel. For example, a vehicle may not be able to reach near the edges of ponds that have a steep downhill grade toward the pond. In this environment, the ground may be soft and watery and the vehicle may risk getting stuck. The lighter prevegetated blanket can be carried to the desired location and installed thus alleviating this potential problem.

Moreover, more square meters of the present, lighter prevegetated blankets can be legally carried on a semi truck or trailer and transported to a job site, reducing the number of trips between the greenhouse or other growing facility and the installation site. Finally, prior blankets tended to shrink between the process of cutting, transporting, and installing at the job site. The present prevegetated blankets do not shrink during this process and thus, even more square meters of surface coverage can be transported and installed at a job site on a single semi truck or trailer.

In previous methods, 2.5 centimeters (1 inch) to 3.8 centimeters (1.5 inches) of dry weight of growth medium such as peat or top soil is utilized. However, in the present invention, 0.3 centimeters (⅛ inch) to 1.9 centimeters (¾ inch) of growth medium such as top soil is used. In the preferred embodiment, no more than 1.3 centimeters (½ inch) of growth medium such a top soil is used.

The following is intended as an illustrative example of the great weight reduction provided by the present invention. In the present invention, live blankets containing 3.34 square meters (36 square feet) of material weigh between 36.29 kilograms (80 pounds) and 56.7 kilograms (125 pounds). In previous methods, sod blankets containing 0.93 square meters (10 square feet) of material weigh 36.3 kilograms (80 pounds) to 38.56 kilograms (85 pounds). For a direct comparison of the approximate weight difference between the previous and present methods, the previous embodiment weights must be multiplied by 3.6 to account for the difference in square meters. For the same amount of material, the previous blankets weigh between 130.63 kilograms (288 pounds) and 138.8 kilograms (306 pounds).

Also, previous methods were severely limited as to the type of plant they are able to grow and transport to installation sites. Previous methods were substantially limited to Kentucky Bluegrass, Ryes, Fescues, Bent Grasses, and Bermuda Grasses. In contrast, the present invention is nearly unlimited as to the plants, seeds, grasses, or bulbs that can be grown, transported and installed. The present invention can handle Kentucky Bluegrass, Ryes, Fescues, Bent Grasses, and Bermuda Grasses. Also, the present invention can grow, transport, and install an unlimited variety of other seeds and plants.

Some examples include, but are not limited to, sedges such as Prairie Sedges, Bristly Sedge, Fox Sedge, and Fringed Sedge, native grasses such as Sweet Grass, Indian Grass, Wood Reed Grass, and June Grass. The present invention can also handle wet mesic plant varieties, woodland grasses, prairie plants, wildflower, and annuals. This list, for the present invention, is intended to illustrate the wide variety of seeds that can be grown, transported, and installed with this invention. However, it by no means is intended to limit the present invention to these seeds alone.

Figure 1:
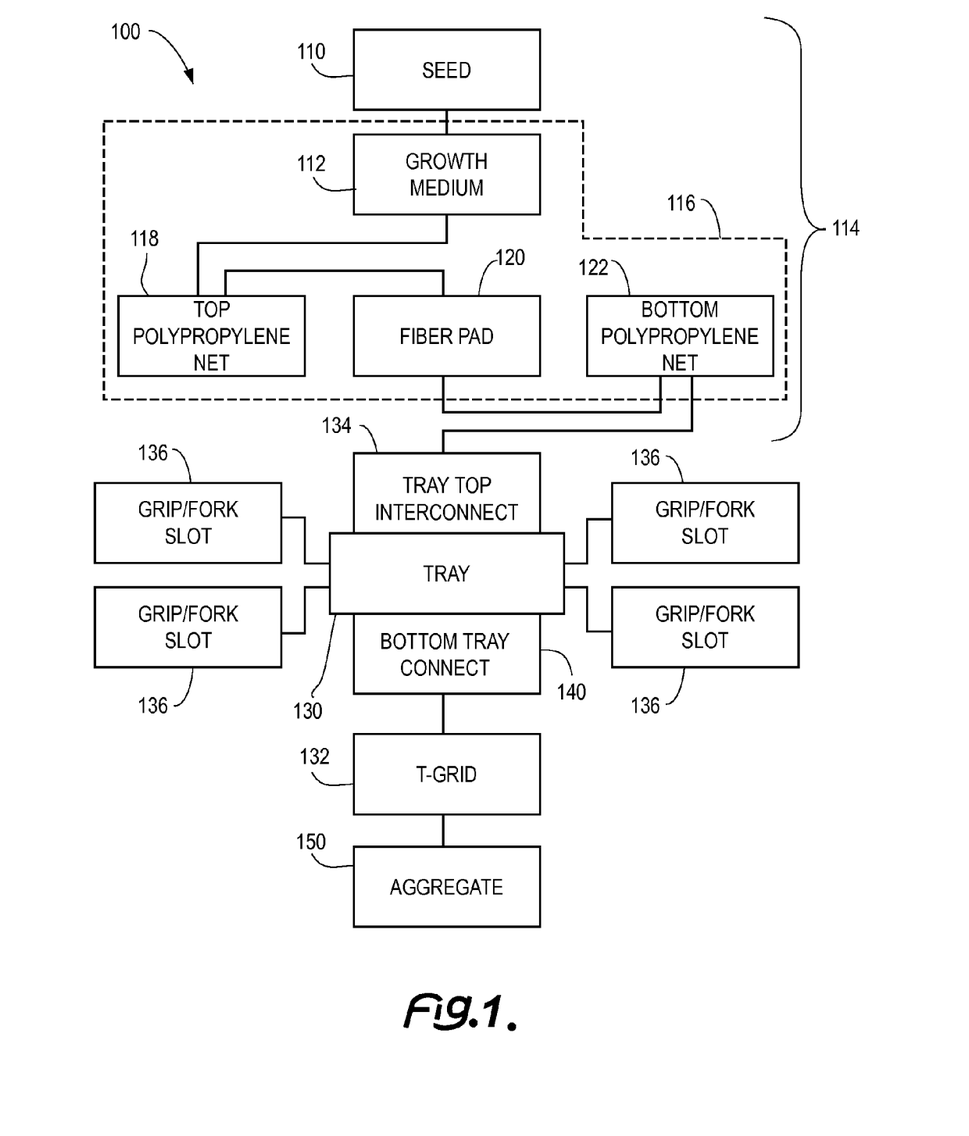
FIG. 1 depicts a box diagram of the structural assembly 100 of this invention.

Referring now to FIG. 1, structural assembly 100 has seed 110 and, in certain cases plant plugs, applied to a fiber pad or fibrous substrate 120. Fiber pad and fibrous substrate 120 are used interchangeably throughout the application but refer to the same component. Between the seed 110 and fiber pad 120 are applied a growth medium 112, such as top soil, and top net 118, preferably of polypropylene. Fiber pad 120 has growth medium 112 and the top net 118 on a top surface thereof and a bottom net 122, preferably of polypropylene, on a bottom surface thereof to form a static prevegetated blanket 116. This structure, by adding seed 110 to the fiber pad 120 forms a live blanket 114 of the prevegetated blanket 116. Fertilizer may also be applied to the seed mix 110 to aid in growth.

Growth medium 112 can be a variety of substances and any suitable substance for providing nutrients and a proper growth environment for the plants is encompassed by this disclosure. In one embodiment, the use of top soil can be substantially limited as to reduce the weight of the live blanket 114 during transport and installation. Thus, the live blanket 114 can be installed in places that are hard to reach by truck or trailer 210. In other embodiments, some suitable examples of growth medium 112 include top soil, sphagnum, vermiculite, or a premixed growing media. Vermiculite and similar materials are very useful for water retention in the live blanket 114. Many of these growth mediums 112 are sold in bulk compost soil establishments and starter nutrients. As can be clearly seen, there is great flexibility and advantages in the use of growth medium 112.

In the preferred embodiment, fibrous pad 120 is 4 millimeters (0.157 inches) to 14 millimeters (0.551 inches) thick. In a more preferred embodiment, fibrous pad 120 is 5 millimeters (0.197 inches) to 13 millimeters (0.512 inches) thick. In the most preferred embodiment, fibrous pad 120 is 6 millimeters (0.236 inches) to 12 millimeters (0.472 inches) thick.

Figure 2:
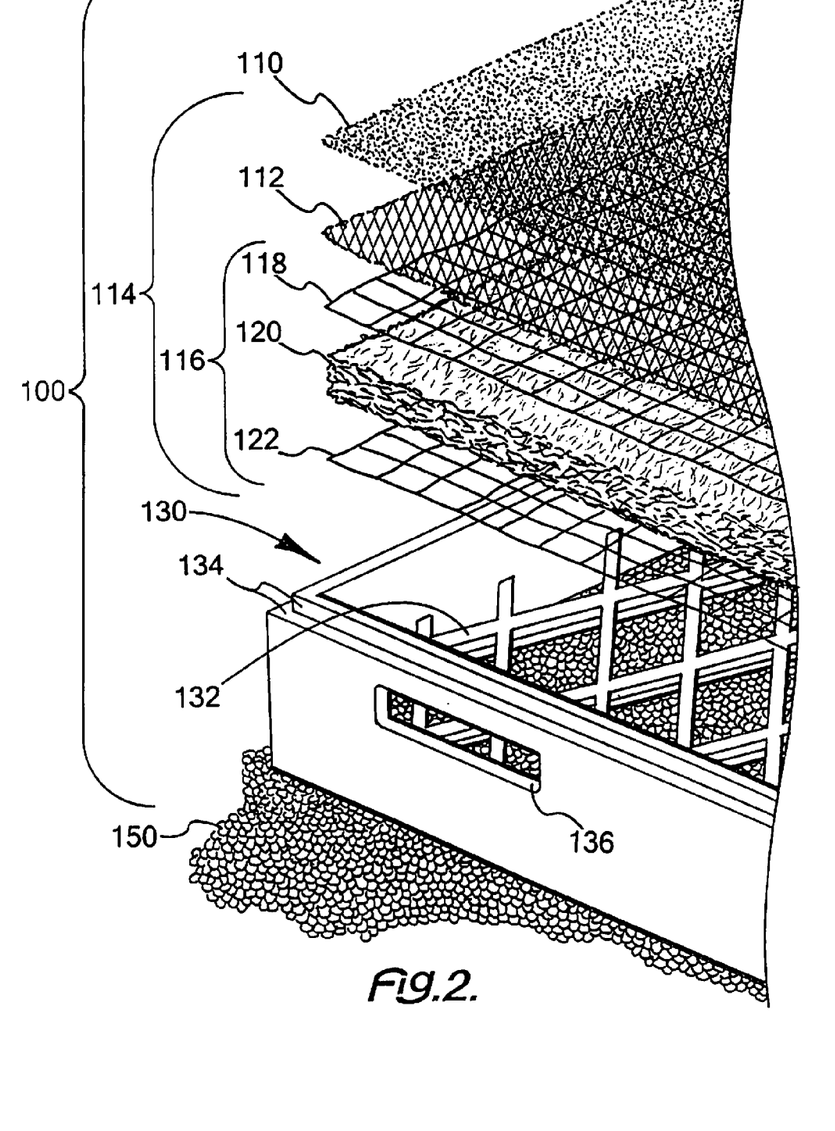
FIG. 2 depicts an exploded, perspective view of the structural assembly 100 for the live blanket 114 and tray 130 of this invention.
Figure 3:
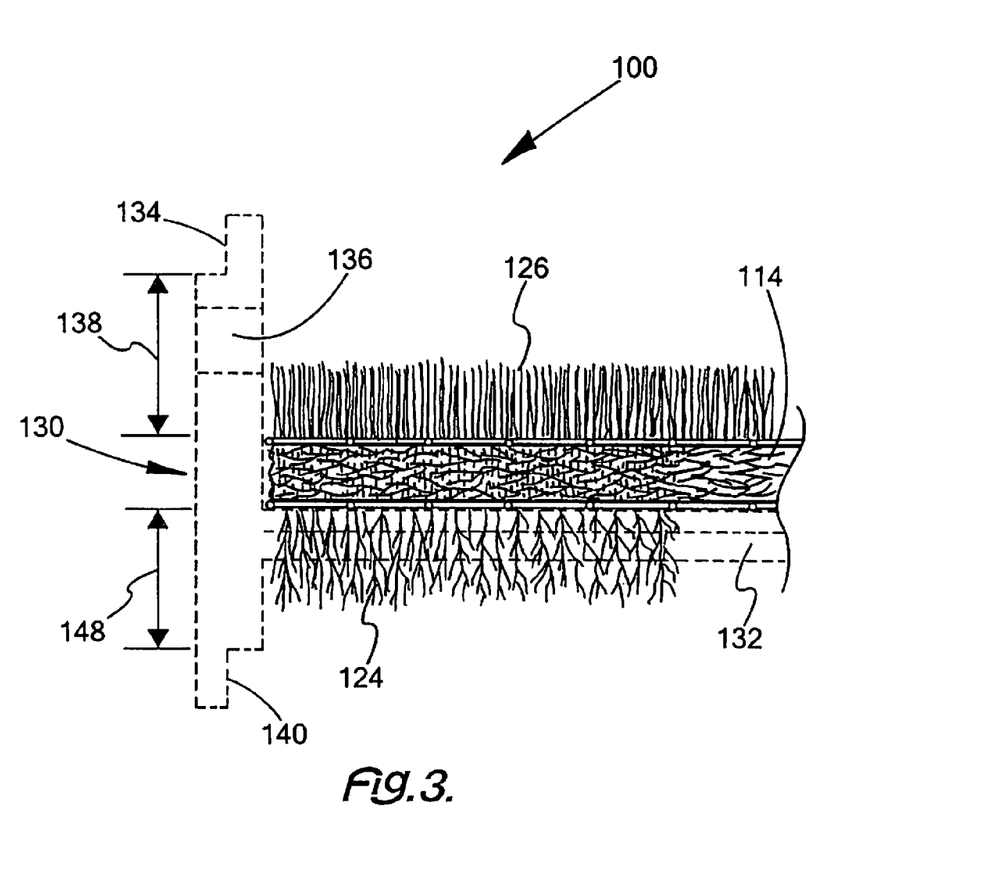
FIG. 3 depicts a side, cut away view of live blanket 114 with established growth, based on FIG. 2.

Adding FIG. 2 and FIG. 3 to the consideration, support for the live blanket 114 comes from a tray support, preferably in the form of tray or tray support 130. Tray 130 is a rectangular or square open tray with edges and a t-grid 132 at a bottom portion thereof for support of live blanket 114. At a top edge of tray 130 is a top tray interconnect 134. Within a side of tray 130 is a grip slot 136. Grip slot 136 provides for lifting tray 130 or a stack thereof manually, or with a forklift or suitable device (not shown). T-grid 132 is low enough in tray 130 to provide a growth space 138 for grass or other plants 126 of live blanket 114.

Top tray interconnect 134 cooperates, preferably in a male to female relationship, with a bottom tray connect 140 on a bottom edge thereof in order to permit nesting or stacking of a plurality of trays 130. Top tray interconnect 134 cooperates with a bottom tray connect 140 to provide a stable stack or nestable stack of trays 130. T-grid 132 is spaced from a bottom of tray 130 in order to provide a root space 148, for roots 124, between a pair or a plurality of stacked trays 130.

The tray 130 may be supported on a supply of smooth aggregate 150 (FIG. 2), which can also serve as a water retaining substance, as the live blanket 114 is assembled therein. However, vermiculite and similar substances are the preferred water retaining substance. Alternatively, the live blanket 114 may be assembled as a larger structure and cut to fit the tray 130. The aggregate 150, with the T-grid 132, supports the live blanket 114. The watering of the live blanket 114 may be facilitated thereby.

Figure 4:
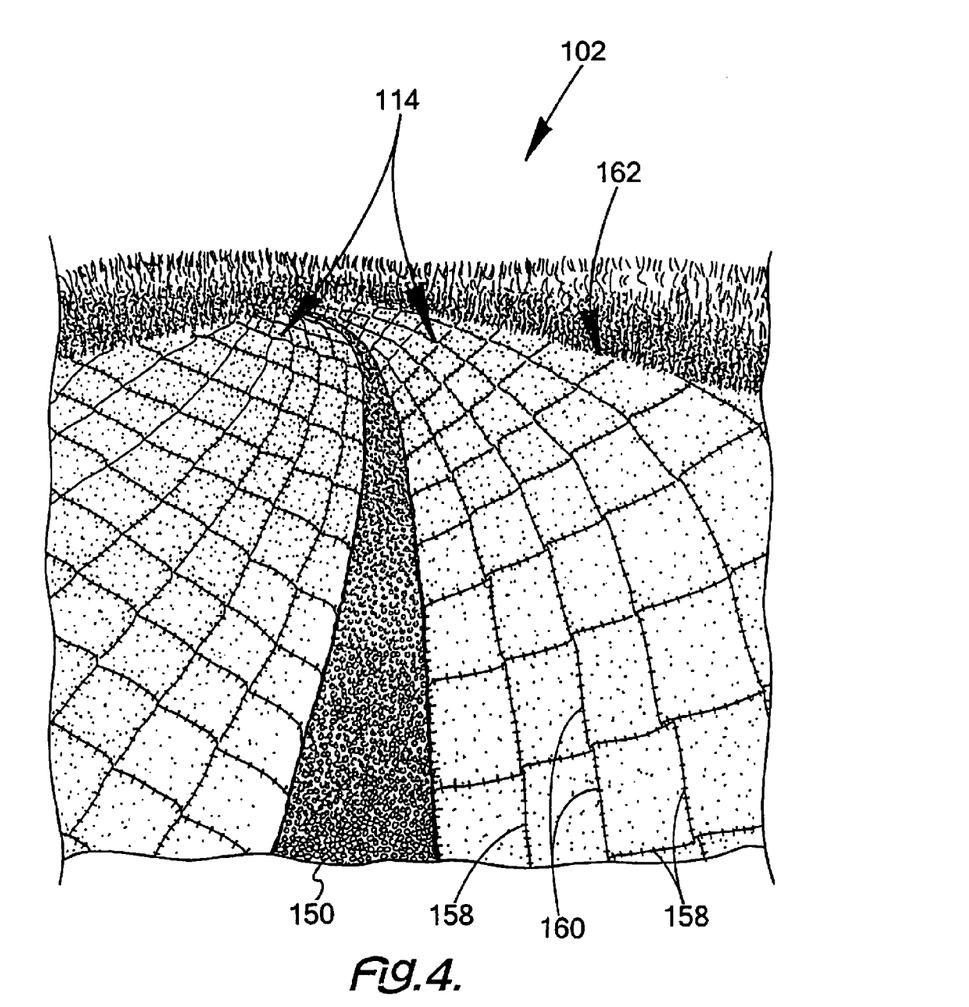
FIG. 4 depicts a perspective view of the structural assembly 100 of this invention on a site 102.

With the further consideration of FIG. 4, use of a series of the live blankets 114 becomes clear. After live blanket 114 is removed from tray 130, roots in root space 148 (as shown in FIG. 3) are applied directly to the soil on site 102. Staples 158, preferably of the landscape type, support the series of live blankets 114 in a desired position. At the edge of each live blanket 114, which adjoins another live blanket 114, is an overlapped edge 160 of the series of live blankets 114. Such overlapping encourages water to run down the live blanket 114, without eroding the same. At the edge of site 102 is a tucked edge 162 of the series of live blankets 114, which does not adjoin another live blanket 114.

Figure 5:
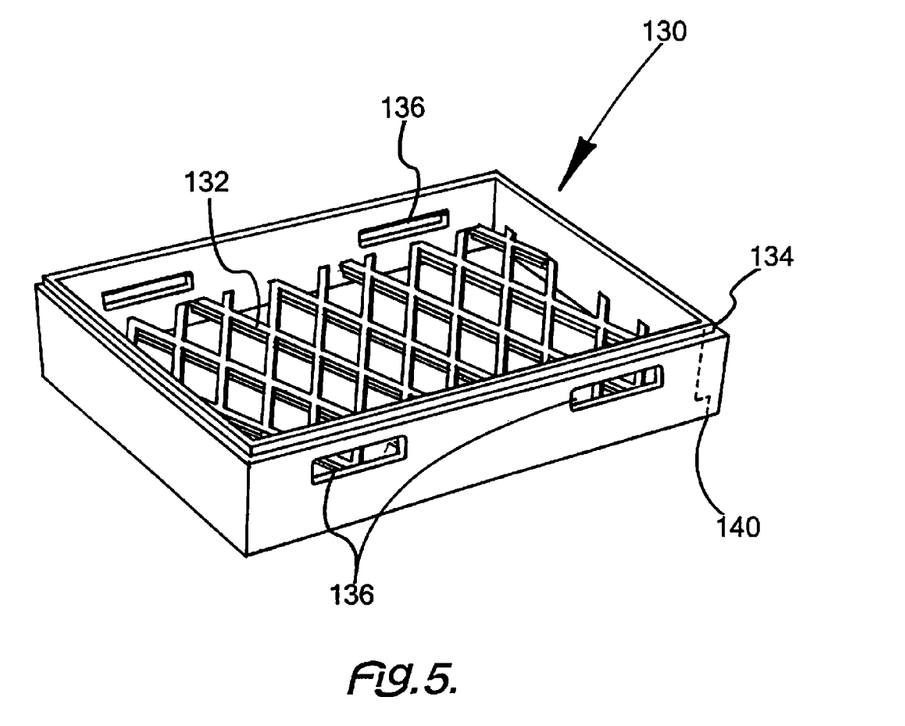
FIG. 5 depicts tray 130 for the structural assembly 100 of this invention.

Now adding FIG. 5 to the discussion, tray 130 has t-grid 132 near a bottom portion thereof, to support live blanket 114. At a top portion of tray 130 is top tray interconnect 134. Top tray interconnect 134 serves as the male portion of the nesting capability for a stack of trays 130. Bottom tray connect 140 (FIG. 3) serves as the female portion of the nesting capability for a stack of trays 130 in cooperation with top tray interconnect 134. Grip slot 136 permits manual or forklift (not shown) lifting of tray or trays 130.

Figure 6:
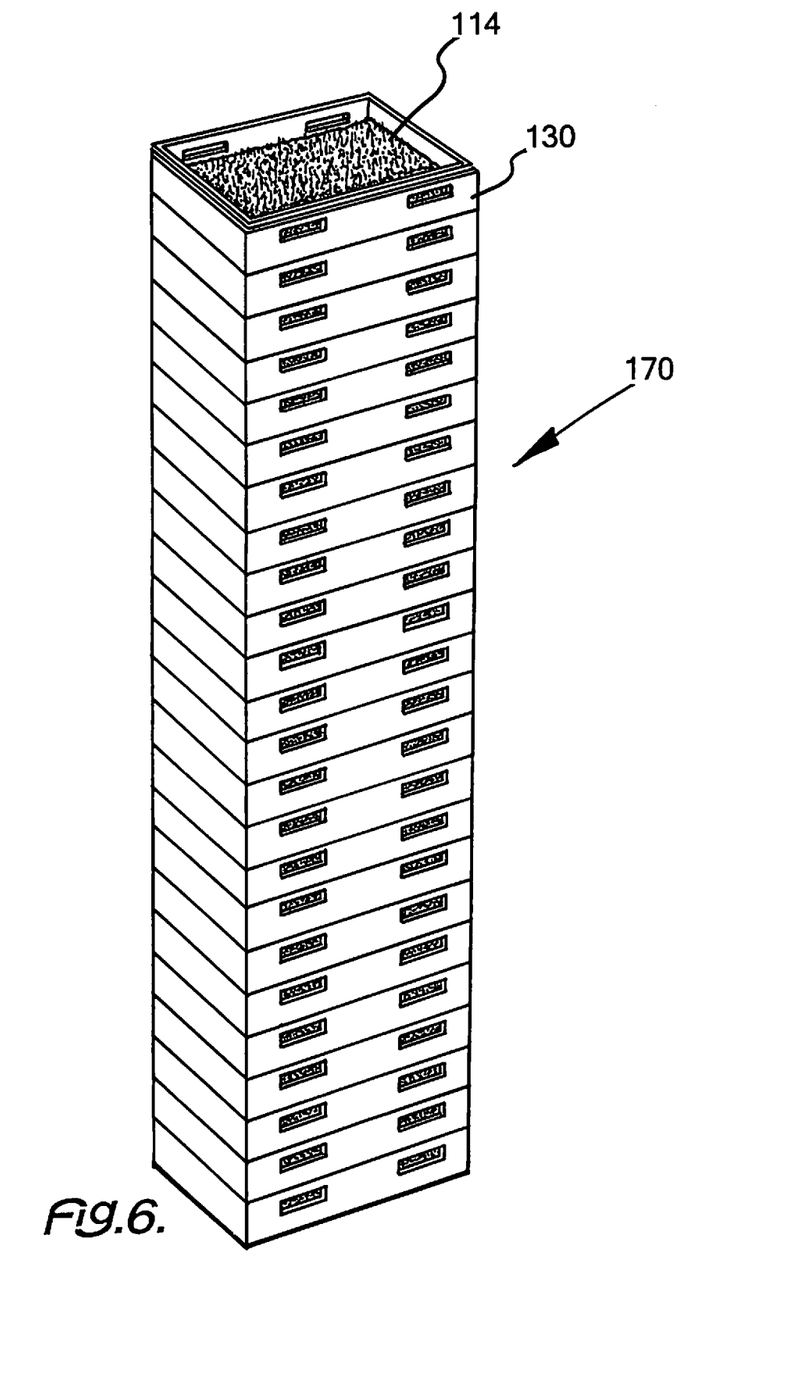
FIG. 6 depicts tray 130 for the structural assembly 100 of this invention as storage stack 170.
Figure 7:
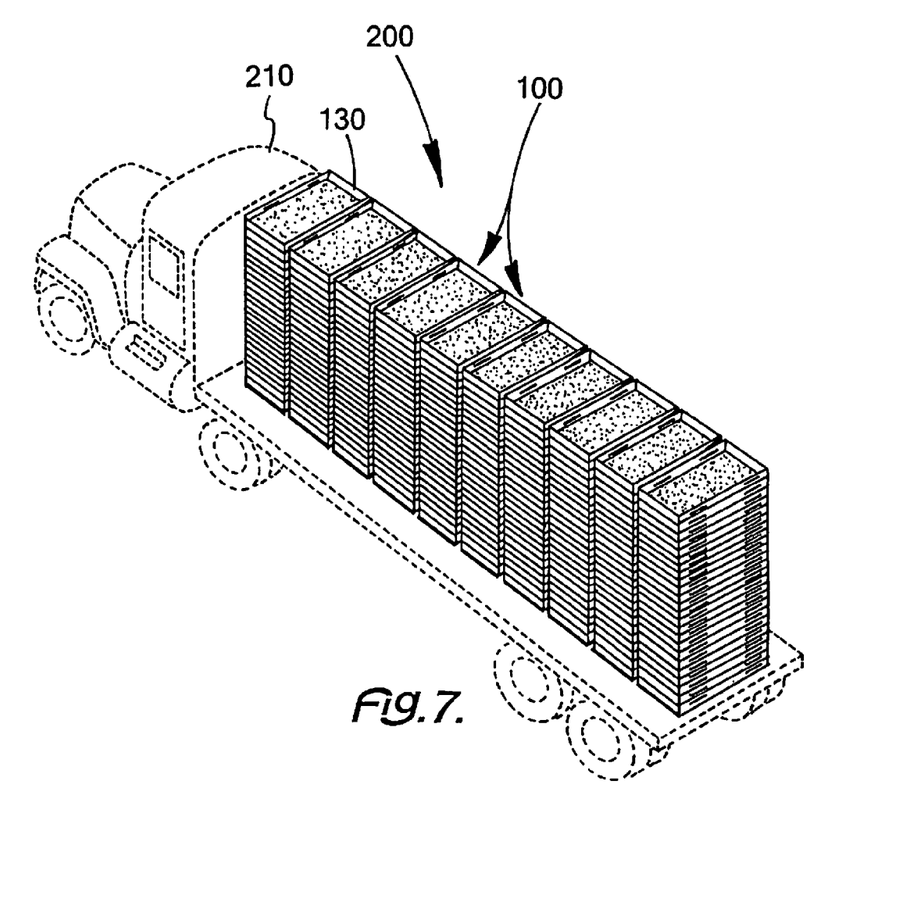
FIG. 7 depicts tray 130 for the structural assembly 100 of this invention as transportation stack 200, on truck 210.

Stacking advantages become even more clear with the consideration of FIG. 6 and FIG. 7. Live blanket 114 within tray 130 can be stacked for storage or transport. Storage stack 170 of trays 130 is shown in FIG. 6. Transportation stack 200 shows a load of a plurality of trays 130 in a series of stacks of ten trays 130 on truck 210. The nesting capability for a stack of trays 130 is thus illustrated. Once installation of the live blanket 114 at a job site is complete, empty tray 130 is returned to the original greenhouse or other growing site and is reused and recycled for future blankets 114.

Stacking of trays 130 on truck 210 has added benefits. The upper trays 130 protect the live blankets 114 in lower trays 130 from heat, sun, wind, and other environmental conditions. Stacking of trays 130 especially helps protect roots 124 from drying and destroying live blanket 114. Stacking of trays 130 offers great advantages and flexibility in transportation and installation of live blankets 114.

Now adding FIG. 8, FIG. 9, FIG. 10, FIG. 11, FIG. 12, FIG. 13, FIG. 14, FIG. 15, and FIG. 16 to the consideration, an alternate embodiment of tray 130 can be clearly seen. Tray 250 functions similarly to tray 130 as shown and described in the earlier embodiments. Also, individual trays 250 can form a stack of trays 252 similar to the stack of trays 170 seen in earlier embodiments.

Tray 250 has t-grid 254 which has similar placement as seen in FIG. 2 and FIG. 3. T-grid 254 is positioned in tray 250 in grid position 294 to allow appropriate root space 148 between t-grid 254 and bottom edge 290. In the growing process, tray 250 can be placed onto and into smooth aggregrate 150 with the t-grid 254 sitting directly on the smooth aggregrate 150 to provide ample space for the growth of roots 124 and ample space for transportation in a nestable stack 252 without harm to roots 124. Also, t-grid 254 is placed in grid position 294 in tray 250 to provide proper growth space 138 between t-grid 254 and upper edge 292 to allow for a plurality of trays 250 to be formed in a nestable stack 252 without harming the growth of the live blanket 114.

Also, t-grid 254 allows roots 124 to assume the t-grid pattern and grow in a diamond or quilted pattern 256. Diamond or quilted pattern 256 provides negative space 258 in the areas roots 124 do not grow due to the interference from the t-grid 254. Once live blanket 114 is installed on site 102, the diamond or quilted pattern 256 of roots 124 aids in handling and filtering rain or water and helps to prevent erosion and destruction of live blanket 114. Negative space 258 of roots 124 absorbs excess rain or water and also filters it in an efficient manner. Diamond or quilted pattern 256 helps prevent live blanket 114 from sliding out of place or being destroyed after installation at site 102.

Tray 250 has rails 262 to strengthen and stabilize tray 250 and prevent inward or lateral distortion of the shape of lower trays 250 from the weight of a stack of trays 252. Rails 262 can be a permanent part of tray 250 or can be a separate and removable addition as seen in removable rails 264.

Referring specifically to FIG. 8, FIG. 9, FIG. 10, FIG. 11, FIG. 12, and FIG. 13, rails 262 are a permanent fixture in t-grid 254. Rails 262 are preferably aluminum but can be made of any suitable material to add strength and support to tray 250. Rails 262 rise above t-grid 254 but do not interfere with the nesting abilities of the stack of trays 252.

Figure 14:
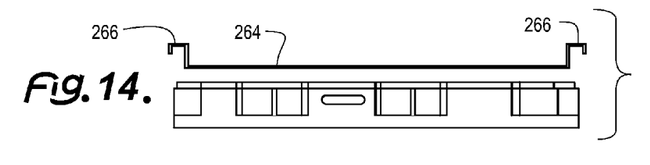
FIG. 14 depicts a side view of tray 250 with removable rail 264.
Figure 15:
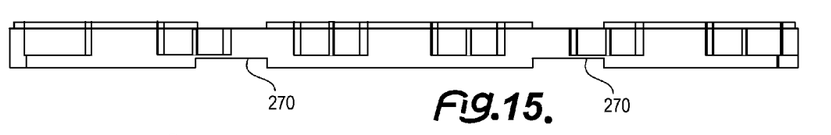
FIG. 15 depicts a side view of tray 250 for the structural assembly 100 of this invention.
Figure 16:
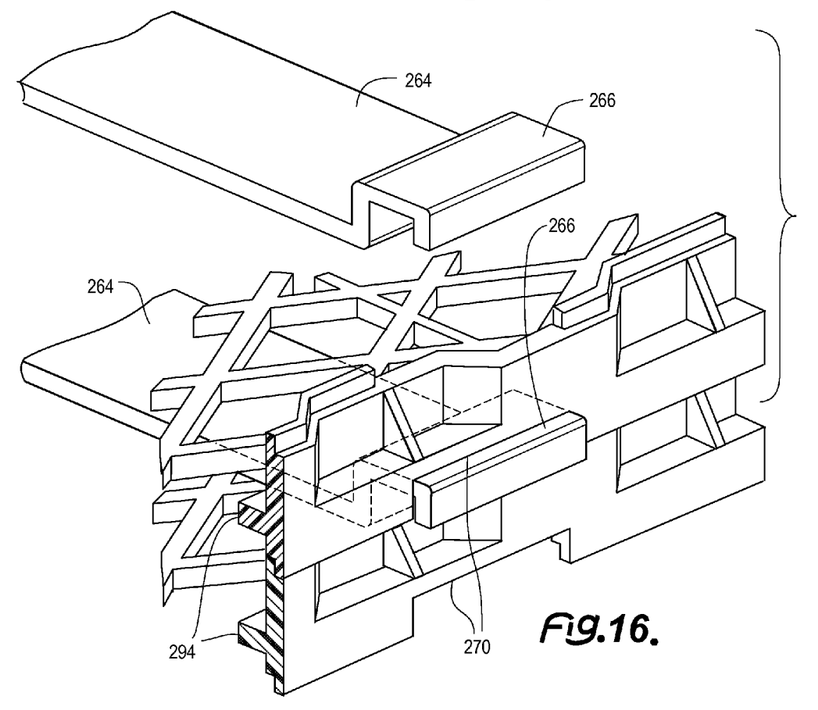
FIG. 16 depicts a perspective, cut away view of tray 250 in a stack of trays 252 with removable rail 264.

Referring specifically to FIG. 14, FIG. 15, and FIG. 16, the function and structure of removable rails 264 can be clearly seen. Removable rails 264 are preferably aluminum but can be made of any suitable material to add strength and support to tray 250 as it is stacked in stack of trays 252. Removable rail 264 has lips 266 on opposing sides which rest over upper edge 292 of tray 250 to secure removable rail 264 in place.

Figure 8:
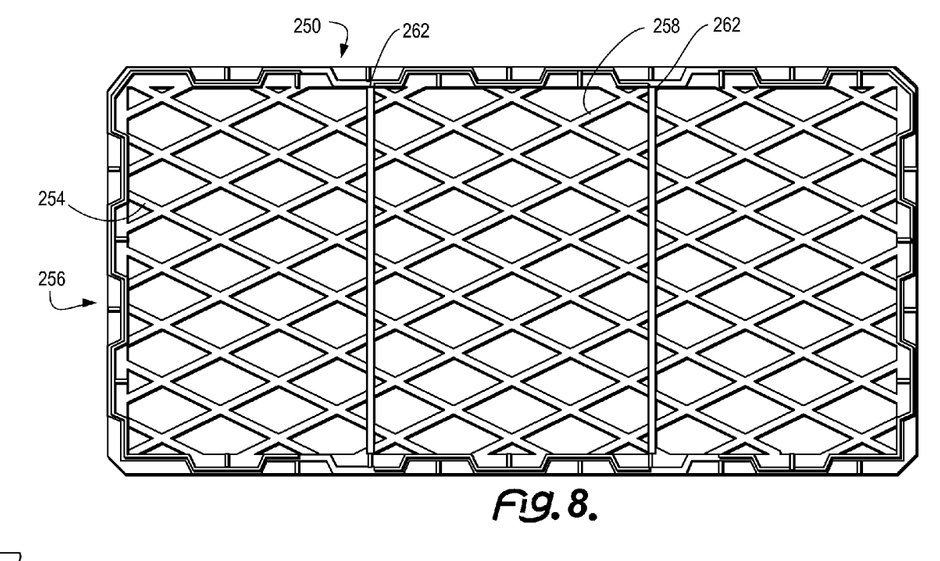
FIG. 8 depicts a top view of tray 250 for the structural assembly 100 of this invention.
Figure 9:
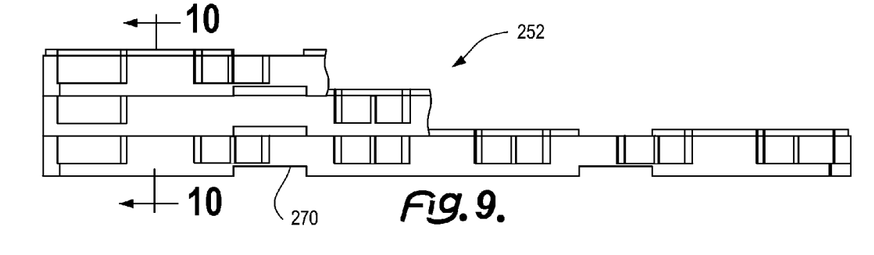
FIG. 9 depicts a side view of tray 250 in a stack of trays 252 for the structural assembly 100 of this invention.
Figure 10:
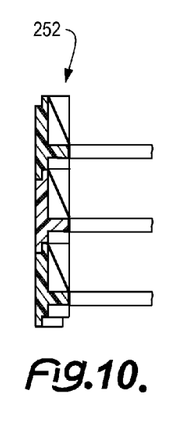
FIG. 10 depicts a cut away view of tray 250 in a stack of trays 252 for the structural assembly 100 of this invention.
Figure 11:
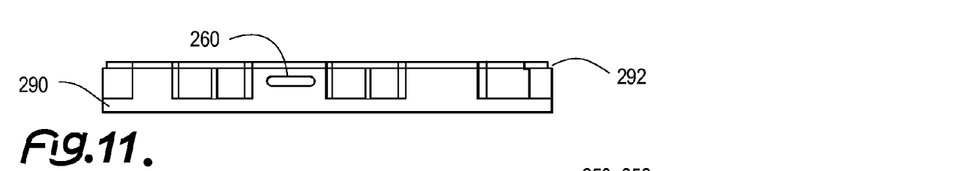
FIG. 11 depicts a side view of tray 250 for the structural assembly 100 of this invention.

Tray 250 has at least two but preferably four hand grips 260 which allow the tray 250 to be manually carried. For example, hand grips 260 allow workers to remove a single tray 250 from truck 210 and carry the tray 250 to areas not accessible by truck 210 or a fork lift (not shown) such as steep banks surrounding bodies of water or extremely wet areas.

Tray 250 has at least two fork lift channels 270 to receive the spades of a forklift (not shown) to aid in transportation and movement of tray 250. Forklift channels 270 are positioned at the bottom edge of tray 250, beneath the t-grid 254, to allow the lifting of tray 250 with minimal invasion of the root space 148 to protect the roots 124. Tray 250 is stacked in the reverse manner as shown in FIG. 7 for tray 130. Trays 250 are stacked in preferably two rows on the longitudinal axis of the flatbed of truck 210. Forklift channels 270 face the external lateral aspect of the flatbed truck 210 rather than longitudinally as shown in FIG. 7 for tray 130.

Tray 250 can be stacked onto another tray 250 to form a stack of trays 252. Each tray 250 has a top tray interconnect 280 and a bottom tray connect 282 to aid in forming stable stacks of trays 252. Top tray interconnect 280 is located on the upper perimeter of tray 250 while bottom tray connect 282 is a recess located on the lower perimeter of the inside edge 284 of tray 250. Top tray interconnect 280 is a lip with preferably a corrugated pattern and acts as the male portion. Bottom tray connect 282 is a recess and has the same, matching corrugated pattern of top tray interconnect 280 and receives the top tray interconnect 280 as the female portion in the male to female relationship.

The corrugated pattern of top tray interconnect 280 is interrupted to accommodate forklift channels 270. This interruption allows the spades of the forklift to access forklift channels 270 without interference but still allows for a secure and stable connection between top tray interconnect 280 and bottom tray connect 282.

Figures 12, 13:
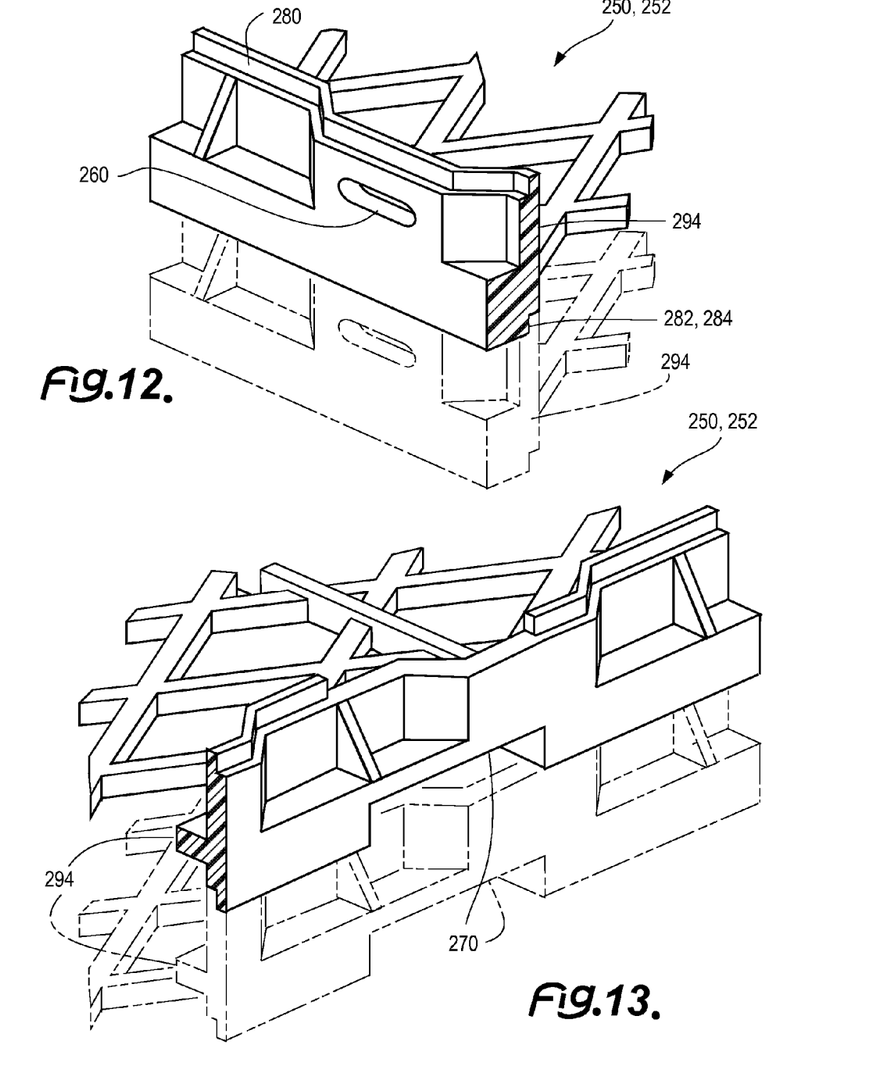
FIG. 12 depicts a perspective, cut away view of tray 250 in a stack of trays 252 with the bottom tray 250 depicted in phantom.
FIG. 13 depicts a perspective, cut away view of tray 250 in a stack of trays 252 with the bottom tray 250 depicted in phantom.

The stack of trays 252 is nestable due to the placement and alignment of the bottom tray connect 282 on the top tray interconnect 280. Top tray interconnect 280 of the lower tray 250 is received by the bottom tray connect 282 of the upper tray 250 and the two trays 250 interlock and form a secure stack of trays 252. The bottom tray connect 282 of the upper tray 250 is able to receive the top tray interconnect 280 of the lower tray 250 and this male to female relationship reduces the overall height of the stack of trays 252 as portions of the upper tray 250 and the lower tray 250 share the same space.

On the other hand, it is also possible to form a stack of trays 252 without aligning the top tray interconnect 280 of the lower tray 250 and the bottom tray connect 282 of the upper tray 250. If either the upper tray 250 or the lower tray 250 is rotated either 90 degrees or 180 degrees, the alignment of the lip of the top tray interconnect 280 of the lower tray 250 is not able to be received by the recess of the bottom tray connect 282 of the upper tray 250. The resulting stack of trays 252 is not nestable due to a reversal of the corrugation pattern on the opposite side resulting from the 180 degree turn or the non-alignment based on the 90 degree axis alignment. This non-nestable relationship provides for rapid disassembly of the stack of trays 252.

Within the current national and stated standards and practices for preventing erosion, growing a living prevegetated erosion control blanket will increase the establishment of a native plant source or cover crop. By using this live blanket 114, weed seeds will remain dormant. Also, soil erosion will be reduced by fifty percent, and the vegetative cover will be increased by eighty percent in a minimum amount of time.

The process of growing the prevegetated blanket is designed using existing erosion control components and standards currently in place in a controlled environment. By using specific existing growing media in a non-soil hydroponics root mass with this prevegetated blanket, vegetation and root stabilization is minimized to two to three weeks. This time compressed system greatly reduces erosion.

A variety of components are suitable for use for the prevegetated blanket. Preferred components of the prevegetated blanket are as follows:

(1) Aggregate: Stone smooth, round, with a diameter of about 0.6 centimeter (0.25 inch) to 2.5 centimeters (0.75 inch) to prevent root growth resistance.

(2) Erosion control blankets are fibrous substrates or blankets of vegetable fibers. Typical such blankets include, but are not limited to the following commercially available blankets: C125 core fiber blanket, DC 250 double net coconut or core blanket, MC 250 double net core matrix blanket, C32 core fiber blanket, TRM C 350 turf reinforcement core matrix blanket and a bio D SCF 30 core stitched blanket with photo degradable netting.

(3) Growing Medium: Sphagnum for organic matter, vermiculite for water retention or water retaining substance and topsoil for seed or a pre mixed growing media. These growth mediums are sold in bulk compost soil establishments as well as starter nutrients.

(4) A seed cover crop including but not limited to wildflower mix, pure mesic, native, herbs, no mow turf, fescue, annual or perennial rye may be used.

Depending upon the blanket application, supplemental plant plugs may be used. The application of the prevegetated blanket will determine the seed source used.

The following is an example of a method of manufacturing or growing a prevegetated blanket that is substantially similar to the method that utilizes tray 130 or tray 250; the method below does not utilize a tray system but is otherwise the same. Manufacturing or growing procedures for the prevegetated blanket include:

Step 1: Growing Area Preparation for the Blanket.

An aggregate base having a thickness between 10 centimeters (four inches) and 33 centimeters (twelve inches) is used. This prevents weeds from germinating up through the aggregate base.

Step 2: Blanket Preparation.

An erosion control blanket between about 2.4 meters (eight feet) wide and 34.1 meters (112 feet) in length are laid out on top of the aggregate. A growing or growth medium or media are then preferably applied on the surface of the blanket at a thickness of about 0.5 centimeter to about 4 centimeters. More preferably, the growing or growth medium or media is applied on the surface of the blanket at a thickness of about 0.5 centimeters to about 3 centimeters. Most preferably, the growing or growth medium or media is applied on the surface of the blanket at a thickness of about 0.5 centimeters to about 1.5 centimeters. Most desirably preferred is thickness of about 1.0 centimeters (0.375 inch). The desired seed mix is then applied on the surface of the growing media. After seed, fertilizer is then applied.

Step 3: Growth Period.

Once the components are installed on the aggregate, the live prevegetated blanket is then preferably watered at a rate of about of 1 liter to 3 liters per square meter. More preferably, the live prevegetated blanket is then preferably watered at a rate of about of 1.5 liters to 2.5 liters per square meter. Most preferably, the live prevegetated blanket is then preferably watered at a rate of about of 1.7 liters to 2.1 liters per square meter. Continued watering depends on the seed applied, anywhere from two liters to 3.9 liters (one gallon) per 0.1 square meter (one square foot) twice a week. To harden the crop before shipment, water is reduced slowly by unit volume for a three to a four-day span.

Within three weeks, a root depth of 1.2 centimeters (0.5 inch) to 2.5 centimeters (about one inch) is established with a shoot height between 1.2 centimeters (0.5 inch) to 5.1 centimeters (about two inches). The product is then ready for shipment to a specific job site for installation.

Step 4: Shipping.

About 9.1 meter (30 feet) sections are cut, shaken lightly to remove any bonded aggregates and lifted to a trailer for transport. The aggregate stays at the greenhouse or other growing facility. The blanket is watered and tarped to prevent moisture loss and damage caused by wind and shipped to a site. The live, prevegetated blanket is installed following all standard installation methods.

Step 5: Installation.

Installation practices follow erosion control blanket standards.

In conclusion, installing a prevegetated erosion control blanket is easier and faster to install with immediate vegetation and is aesthetically more complete visually for a compliance sign off, required for payment on construction projects.

In the following examples, which are intended to illustrate without unduly limiting the scope of this invention, all parts and percentages are by weight unless otherwise indicated.

Example 1

A drainage ditch is designed to carry parking lot water as runoff to a wet detention area. Grading is done to create a swale to carry water to a crested wetland. Under permits and an engineering plan, the site is seeded. Then an applied erosion control measure or blanket is applied to secondarily protect the seed of a specified plant from moving or eroding under the blanket.

About one week later, about one inch of rain washes away the seed, because there are no growing roots from seed to prevent the washing away or erosion. After a month, the crop of annual weeds appears, and new seed plants are forced out because of compaction or competition.

Example 2

The procedure of Example 1 is repeated, except that a live prevegetated blanket using the same seed as Example 1, replaces the seed and the blanket of Example 1. About one week later about one inch of rain leaves the seed intact because there are growing roots from seed to prevent erosion. After a month, the crop of new seed plants is well settled, and the annual weeds common to the area are absent. The use of the live prevegetated blanket provides the successful end result of this example.

This application—taken as a whole with the abstract, specification, claims, and drawings—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A tray assembly for transporting a plurality of prevegetated blankets to a desired location comprising:
  a) the tray assembly including a tray support;
  b) the tray support being an open tray;
  c) the open tray having sides with a t-grid at a bottom portion thereof;
  d) the t-grid being adapted to support a prevegetated blanket;
  e) a top tray interconnect being at a top edge of the sides of the open tray;
  f) a bottom tray connect being at a bottom edge of the sides of the open tray;
  g) at least one grip slot for lifting the open tray being positioned in one of the sides;
  h) the top tray interconnect adjoining with the bottom tray connect to form stacked trays in pairs or in a plurality;
  i) the grip slot facilitating a lifting of the open tray or a plurality thereof;
  j) the t-grid being positioned low enough in the tray to provide a growth space for the prevegetated blanket;
  k) the t-grid being spaced in order to provide a root space between a pair or a plurality of stacked trays; and
  l) the top tray interconnect joining with the bottom tray connect in a male to female relationship.

2. The tray assembly of claim 1 further comprising:
  a) a stack of the trays with a prevegetated blanket in each tray for storage or transport;
  b) the root space for the prevegetated blanket being provided in the tray or at a site;
  c) the open tray being rectangular and
  d) a smooth aggregate being placed below the tray to support the growth of the prevegetated blanket and facilitate the watering of the prevegetated blanket in the tray assembly.

3. A tray for forming and transporting at least one prevegetated blanket comprising:
  a) the tray being an open tray;
  b) the tray being formed by two sets of oppositely opposed side walls;
  c) the tray having a t-grid supported by the two sets of oppositely opposed side walls;
  d) the tray having a top tray interconnect at an upper edge thereof;
  e) the tray having a bottom tray connect at a bottom edge oppositely opposed from the upper edge;
  f) the top tray interconnect adjoining with the bottom tray connect to form a pair or a plurality of stacked trays;
  g) the tray having the t-grid supported at a grid position on the two sets of oppositely opposed side walls;
  h) the grid position of the t-grid being positioned low enough in the tray to provide a growth space for the prevegetated blanket;
  i) the grid position of the t-grid being spaced in order to provide a root space between the pair or the plurality of stacked trays;
  j) the top tray interconnect joining with the bottom tray connect in a male to female relationship;
  k) the t-grid having a pattern of repeating apertures to create a corresponding root growth pattern;
  l) the plurality of stacked trays having a series of alternating lower trays and upper trays;
  m) the top tray interconnect of a lower tray of the series of alternating lower trays and upper trays aligning with the bottom tray connect of an upper tray of the series of alternating lower trays and upper trays to form a nestable stack;
  n) at least one of the upper trays of the series of alternating lower trays and upper trays being rotated either 90 degrees or 180 degrees from alignment to form a non-nestable relationship to provide for a rapid disassembly of the stack;
  o) the tray having at least two hand grips for lifting and transporting the tray;
  p) the at least two hand grips being positioned in at least one of the two sets of oppositely opposed side walls of the tray;
  q) the tray having at least two forklift channels underneath the t-grid to accept a set of spades of a forklift;
  r) the forklift channels facilitating lifting of the tray, the pair of stacked trays or the plurality of stacked trays; and
  s) the pattern of repeating apertures of the t-grid having a negative space and producing a similar negative space in a root growth.

4. The tray of claim 3 further comprising:
  a) the tray having at least one rail to add strength and support to the tray during stacking;
  b) the at least one rail being at least one removable rail;
  c) the at least one removable rail having a lip at opposing edges thereof;
  d) each of the lips resting over an upper edge of the tray to securely attach the at least one removable rail to the tray;
  e) the pattern of repeating apertures of the t-grid having a diamond or quilted pattern to create a corresponding diamond or quilted root growth pattern; and
  f) the diamond or quilted pattern of the t-grid having the negative space and producing a similar negative space in the root growth.

5. An improvement to a tray for forming and transporting at least one prevegetated blanket comprising:
  a) the tray being an open tray;
  b) the tray being formed by two sets of oppositely opposed side walls;
  c) the tray having a t-grid supported by the two sets of oppositely opposed side walls;
  d) the tray having a top tray interconnect at an upper edge thereof;

e) the tray having a bottom tray connect at a bottom edge oppositely opposed from the upper edge;
f) the top tray interconnect adjoining with the bottom tray connect to form a pair or a plurality of stacked trays;
g) the tray having the t-grid supported at a grid position on the two sets of oppositely opposed side walls;
h) the grid position of the t-grid being positioned low enough in the tray to provide a growth space for the prevegetated blanket;
i) the grid position of the t-grid being spaced in order to provide a root space between the pair or the plurality of stacked trays;
j) the top tray interconnect joining with the bottom tray connect in a male to female relationship;
k) the t-grid having a pattern of repeating apertures to create a corresponding root growth pattern;
l) the plurality of stacked trays having a series of alternating lower trays and upper trays;
m) the top tray interconnect of a lower tray of the series of alternating lower trays and upper trays aligning with the bottom tray connect of an upper tray of the series of alternating lower trays and upper trays to form a nestable stack;
n) at least one of the upper trays of the series of alternating lower trays and upper trays being rotated 90 degrees or 180 degrees from alignment to form a non-nestable relationship to provide for a rapid disassembly of the stack;
o) the tray having at least two hand grips for lifting and transporting the tray;
p) the at least two hand grips being positioned in at least one of the two sets of oppositely opposed side walls of the tray;
q) the tray having at least two forklift channels underneath the t-grid to accept a set of spades of a forklift;
r) the forklift channels facilitating lifting of the tray, the pair of stacked trays or the plurality of stacked trays; and
s) the pattern of repeating apertures of the t-grid having a negative space and producing a similar negative space in a root growth.

6. The tray of claim 5 further comprising:
a) the tray having at least one rail to add strength and support to the tray during stacking;
b) the at least one rail being at least one removable rail;
c) the at least one removable rail having a lip at opposing edges thereof;
d) each of the lips resting over an upper edge of the tray to securely attach the at least one removable rail to the tray;
e) the pattern of repeating apertures of the t-grid having a diamond or quilted pattern to create a corresponding diamond or quilted root growth pattern; and
f) the diamond or quilted pattern of the t-grid having the negative space and producing a similar negative space in the root growth.

\* \* \* \* \*